US010050445B2

(12) United States Patent
Pahlevaninezhad et al.

(10) Patent No.: US 10,050,445 B2
(45) Date of Patent: Aug. 14, 2018

(54) PV INVERTER WITH MICRO/NANO-GRID INTEGRATION CAPABILITY

(71) Applicants: Majid Pahlevaninezhad, Kingston (CA); Suzan Eren, Kingston (CA); Shangzhi Pan, Kingston (CA); Praveen Jain, Kingston (CA)

(72) Inventors: Majid Pahlevaninezhad, Kingston (CA); Suzan Eren, Kingston (CA); Shangzhi Pan, Kingston (CA); Praveen Jain, Kingston (CA)

(73) Assignee: SPARQ SYSTEMS INC., Kingston (CA)

( * ) Notice: Subject to any disclaimer, the term of this patent is extended or adjusted under 35 U.S.C. 154(b) by 194 days.

(21) Appl. No.: 15/209,439

(22) Filed: Jul. 13, 2016

(65) Prior Publication Data

US 2017/0018932 A1 Jan. 19, 2017

Related U.S. Application Data

(60) Provisional application No. 62/191,849, filed on Jul. 13, 2015.

(51) Int. Cl.

| | |
|---|---|
| ***H02J 3/38*** | (2006.01) |
| ***H02M 7/48*** | (2007.01) |
| *H02M 1/00* | (2006.01) |

(52) U.S. Cl.

CPC .............. *H02J 3/385* (2013.01); *H02J 3/381* (2013.01); *H02J 3/382* (2013.01); *H02J 3/386* (2013.01); *H02M 7/48* (2013.01); *H02M 2001/007* (2013.01); *H02M 2001/0012* (2013.01); *Y02E 10/56* (2013.01)

(58) Field of Classification Search

CPC ............ H02J 3/385; H02J 3/382; H02J 3/386; H02M 7/48; H02M 2001/0012; H02M 2001/007; Y02E 10/56

See application file for complete search history.

(56) References Cited

U.S. PATENT DOCUMENTS 8,922,185 B2 * 12/2014 Ehlmann ................ H02J 3/385 323/284
2007/0221267 A1 * 9/2007 Fornage ................ H02M 3/285 136/244
2014/0218985 A1 * 8/2014 Yu ........................ H02M 7/537 363/97

* cited by examiner

*Primary Examiner* — Jared Fureman
*Assistant Examiner* — Michael Warmflash
(74) *Attorney, Agent, or Firm* — Brion Raffoul

(57) ABSTRACT

Systems, methods, and devices relating to inverters. A control system for use with photovoltaic panel coupled inverters controls the function and operation of the inverter based on the voltage at the point of common coupling. The inverter is operated in either current control mode or in voltage control mode based on whether or not the inverter is coupled to a grid or whether other energy sources are available to control the voltage at the point of common coupling.

13 Claims, 8 Drawing Sheets

PV INVERTER WITH MICRO/NANO-GRID INTEGRATION CAPABILITY

RELATED APPLICATIONS

This application is a non-provisional application which claims the benefit of U.S. Provisional Patent Application No. 62/191,849 filed on Jul. 13, 2015.

TECHNICAL FIELD

The present invention relates to systems, methods, and devices relating to converting power from DC power generation sources to AC power for use in a power grid. More specifically, the present invention relates to a photovoltaic inverter with the capability to operate in both the grid-connected mode and the stand-alone mode.

BACKGROUND

Distributed Generations (DGs) power sources are becoming more prevalent due to their advantages over central power generations. By harvesting energy from renewable energy sources, DGs can provide a sustainable solution for future power generation. In particular, solar energy can be harvested through Photovoltaic (PV) panels using PV inverters. PV inverters convert the DC power to an AC power compatible with the utility grid. In a distributed generation scheme, PV inverters should be able to integrate into the DG by reliably operating in the presence of other energy sources. Also, PV inverters should be able to operate in a grid-connected mode (on-grid) or in a stand-alone mode (off-grid) as a reliable power source. For instance, in a micro-grid scenario, the PV inverter should be able to perform in the presence of energy storage systems as well as in the presence of other energy sources such as a wind based generator or other forms of distributed power generators.

FIG. 1 shows a scenario where multiple energy sources are simultaneously operating with or without the presence of the utility grid. This figure shows an exemplary arrangement of the prior art for a micro-grid. In FIG. 1, the micro-grid includes PV panels, a wind turbine, and a generator as energy sources and a battery as an energy storage unit. The PV microinverters deliver the power from the PV panels to the micro-grid. In this system, intelligent circuit breakers are used to connect and disconnect the PV inverters from different components of the system. The intelligent circuit breakers are used to communicate with the PV microinverters in order to safely connect and disconnect different components of the micro-grid. One drawback of such a system is the requirement for a reliable communication system in order to safely synchronize different components of such a micro-grid. Another drawback is that, in many cases, the microinverters are not able to produce power on their own in the stand-alone mode due to the reactive power requirement of the local load.

The micro-grid in FIG. 1 requires several intelligent circuit breakers with a reliable communication. This increases the complexity and overall cost of the system. Also, in stand-alone mode, it is common for supervisory control to be required to perform the power management and to harmonize different components of the system. This supervisory controller needs to communicate with different local controllers in each component of the micro-grid, each of which could be in different physical locations. The architecture of this system is therefore not very reliable.

Based on the above, there is therefore a need for systems and devices which mitigate if not avoid the shortcomings of the prior art.

SUMMARY

The present invention provides systems, methods, and devices relating to inverters. A control system for use with photovoltaic panel coupled inverters controls the function and operation of the inverter based on the voltage at the point of common coupling. The inverter is operated in either current control mode or in voltage control mode based on whether or not the inverter is coupled to a grid or whether other energy sources are available to control the voltage at the point of common coupling.

In a first aspect, the present invention provides a system for controlling a DC/DC converter and a DC/AC inverter, an output of said converter being input to said inverter, said converter receiving an input from a renewable energy source and an output of said inverter being sent to a power grid when a connection to said power grid at a point of common coupling is active, system comprising:

- a grid observer block for receiving an output voltage and an output current of said inverter;
- a nonlinear hybrid controller receiving an output of said grid observer;
- a converter controller receiving said output of said grid observer, said converter controller also receiving an input voltage and an input current to said converter;
- a phase shift modulator block receiving an output of said converter controller, an output of said phase shift modulator block being received by said converter;
- a pulse width modulator block receiving an output of said nonlinear hybrid controller, an output of said pulse width modulator block being received by said inverter;

wherein

- said grid observer block determines a common coupling voltage at said point of common coupling based on said output voltage and said output current and, based on said voltage, determines an operating mode of said inverter.

In a second aspect, the present invention provides a method for controlling circuitry for converting power from a renewable energy source for use with a power grid, the method comprising:

a) determining an output current and an output current of a power inverter;

b) determining a common coupling voltage of a point of common coupling, said point of common coupling being a connection point between said power inverter and said power grid;

c) determining if said connection point is active by determining if said common coupling voltage is within predetermined parameters;

d) if said common coupling voltage is not within predetermined parameters, operating said inverter in voltage mode;

e) if said common coupling voltage is within predetermined parameters, operating said inverter in current mode.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
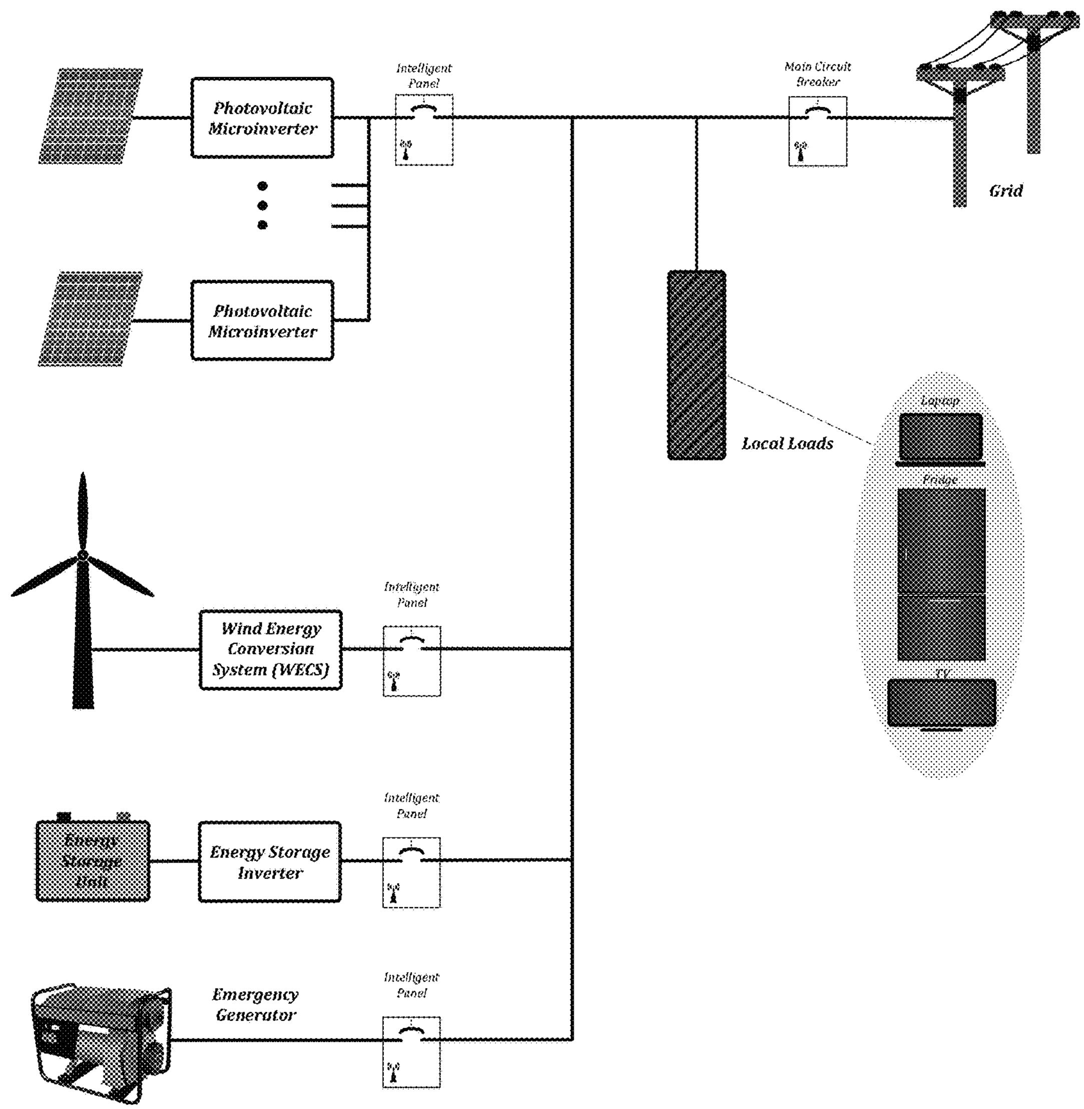
FIG. 1 is a block diagram of an energy grid according to the prior art.
Figure 2:
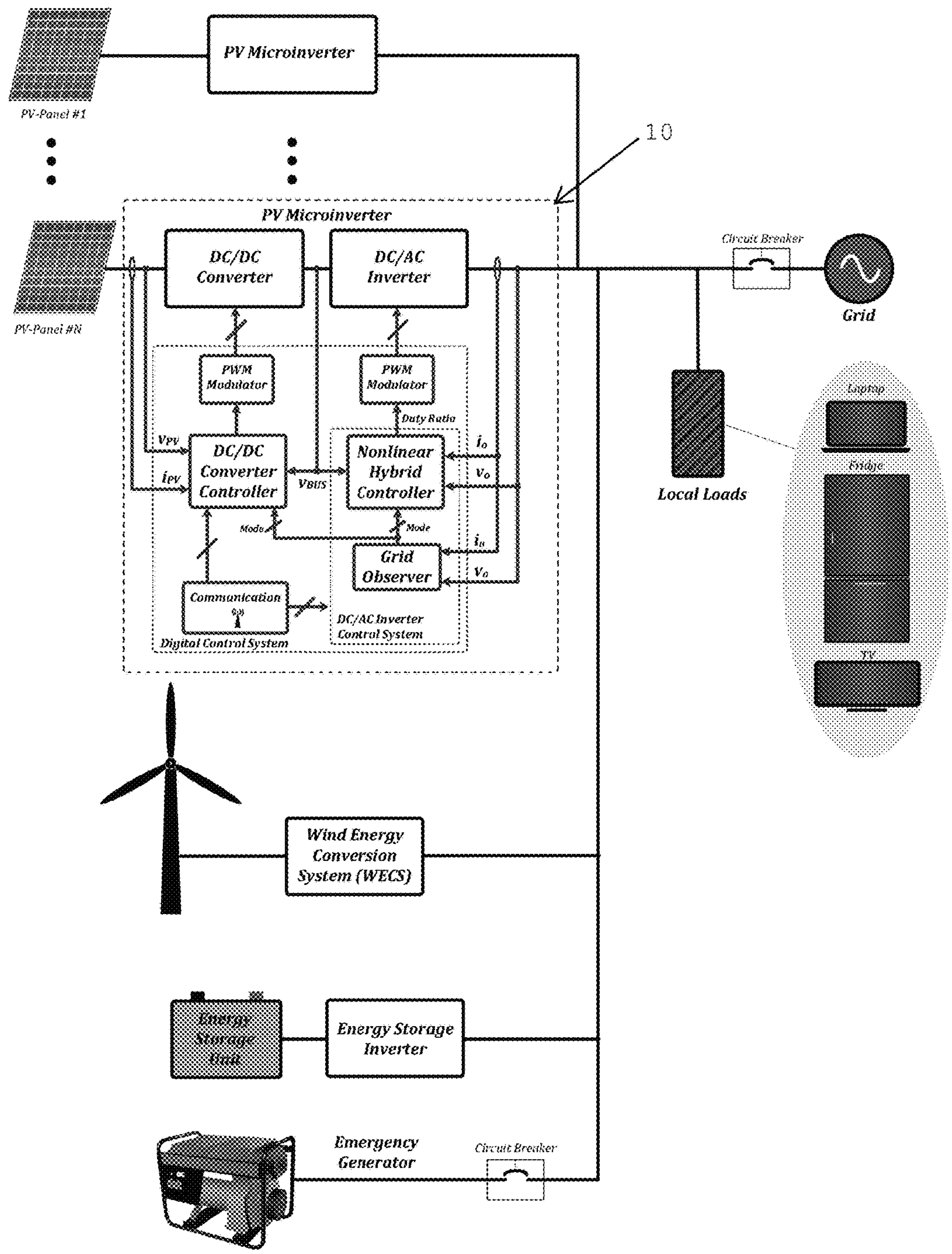
FIG. 2 is a block diagram of an energy grid incorporating one aspect of the present invention.

As noted above, various aspects of the present invention are for use with photovoltaic (PV) panels and for managing the conversion of energy from the PV panels so that the energy may be available for use by a power grid. Referring to FIG. 2, illustrated is an arrangement in which a microinverter, according to one aspect of the invention, is integrated into a micro-grid. In this structure, the microinverter 10 is seamlessly integrated into a micro-grid without the need for an external box for circuit breakers and intelligent circuit breaker panels. As can be seen, the microgrid includes local loads, different renewable energy sources (e.g. wind energy sources and PV panels), energy storage units, and emergency generator energy sources.

In one aspect of the invention, a grid observer block is embedded into the microinverter control system. The grid observer estimates the grid condition by sensing the grid voltage and the grid current. The grid observer then provides this grid information to the control system. This allows the control system to adaptively adjust the operation of the microinverter by observing the micro-grid condition and to thereby act accordingly. Because of this, the arrangement can significantly reduce the complexity of a micro-grid implementation.

Figure 3:
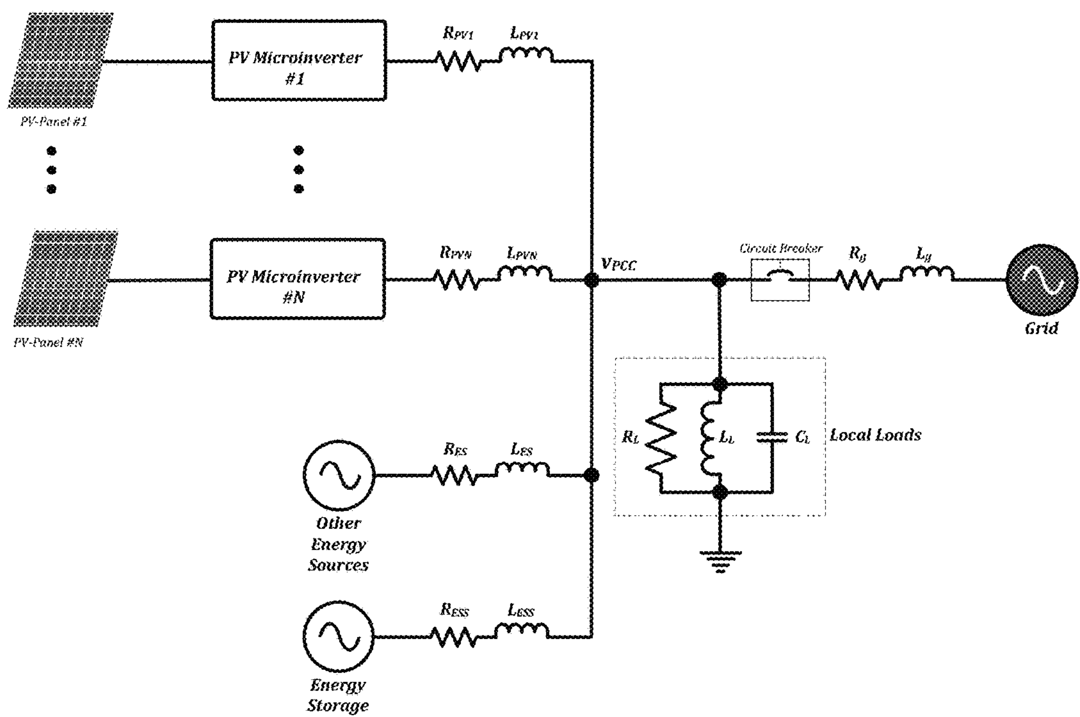
FIG. 3 is a schematic diagram illustrated an energy grid in which the present invention may be used.

Referring to FIG. 3, a schematic diagram of the microgrid illustrated in FIG. 2 is shown. In FIG. 3, each branch of the energy network has an associated impedance (e.g. $R_{PV1}$, $R_{ES}$, $R_{ESS}$) and inductance (e.g. $L_{PV1}$, $L_{ES}$, $L_{ESS}$). Each branch connects to the other branches by way of a point of common coupling. Also coupling to the network by way of the point of common coupling are the local loads as well as the grid. The grid is represented by a grid inductance ($L_g$) and a grid impedance ($R_g$). As with the illustrated network in FIG. 2, the network in FIG. 3 can include solar energy, energy storage, local loads, and other sources of energy (e.g. wind, diesel generator, solar panels, etc.). This micro/nano-grid network can be used for residential applications (nano-grid) or for higher scale applications (micro-grid). Different components in this micro/nano-grid are coupled to the point of common coupling (PCC) through an impedance representing the wire impedance connecting each component to the point of common coupling.

In another aspect of the invention, the system of the present invention adaptively observes the grid condition and duly changes the structure of the controller in order to seamlessly switch between on-grid and off-grid modes. This observation of the grid condition does not require any external signals to be sent from the breakers to the microinverter. The microinverter is therefore intelligent enough to detect the change in the grid condition and to act accordingly.

Figure 4:
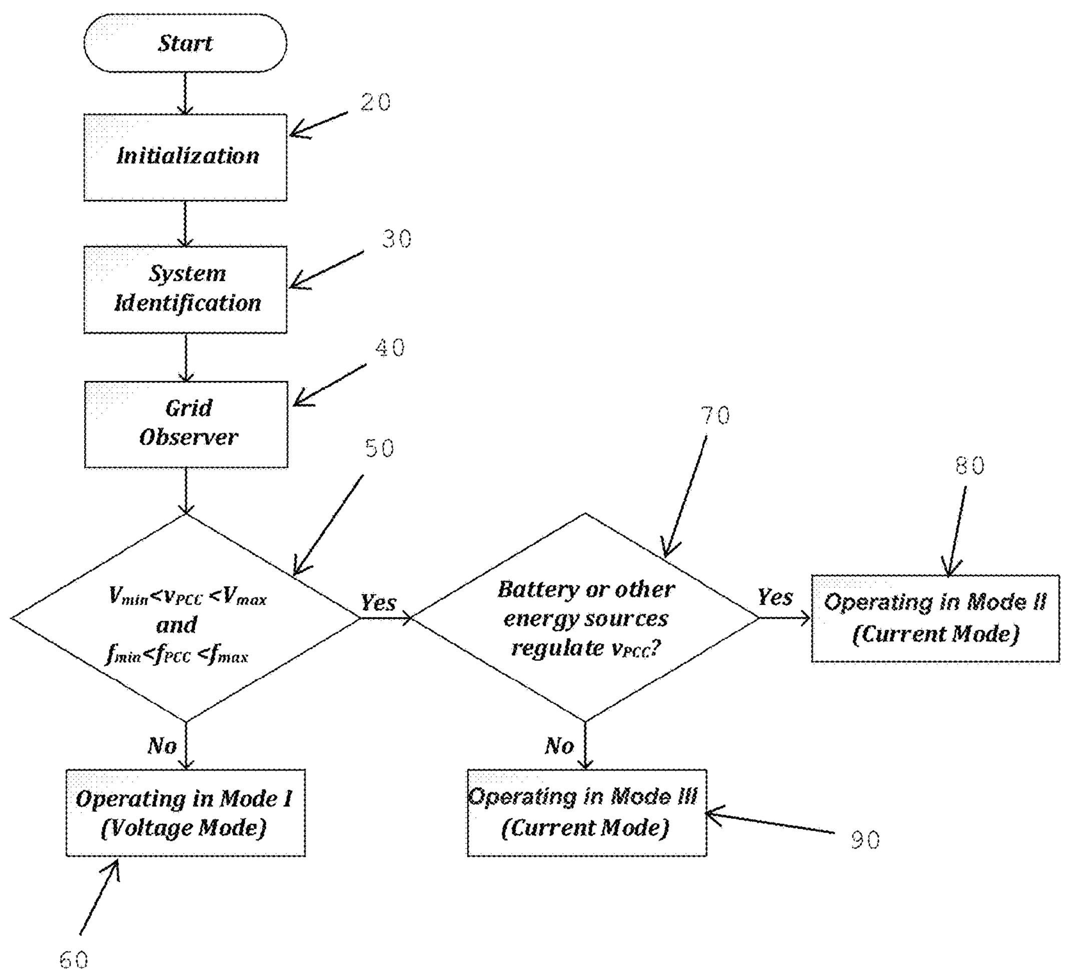
FIG. 4 is a flowchart illustrated the steps in a method according to one aspect of the present invention.

Referring to FIG. 4, a flowchart detailing a method for controlling a PV connected inverter is illustrated. The method begins at step 20 where the control system is initialized during initialization. The system identification process then identifies the output impedance of the microinverter (i.e., $R_{PV}$, $L_{PV}$) in step 30. After this, in step 40, the grid observer process estimates the grid condition by using the output voltage and the output current of the microinverter. Decision 50 checks the point of common coupling voltage to determine if it is within specific limits and whether the frequency of the signal at the point of common coupling is also within specific limits. Based on the estimation of the grid condition, the control system can operate in three distinct modes. If the grid is not present (step 60), the grid observer process changes the structure of the control system to operate in the off-grid mode (Mode I). If the voltage is present at the output of the microinverter (i.e. the voltage at the point of common coupling is within specific limits), then decision 70 checks as to which of the two possible scenarios is operative. If other energy sources are regulating the voltage at the point of common coupling, then the inverter should operate in Mode II (step 80). If the grid is regulating the voltage at the point of common coupling, then the inverter should operate in Mode III (step 90). Based on the above, there are three distinct operating modes: off-grid without the presence of energy storage/other energy sources (Mode I), off-grid with the presence of energy storage/other energy sources (Mode II), and on-grid with the presence of grid (Mode III). The grid observer detects the grid condition and determines the operating mode for the inverter accordingly.

Figure 5:
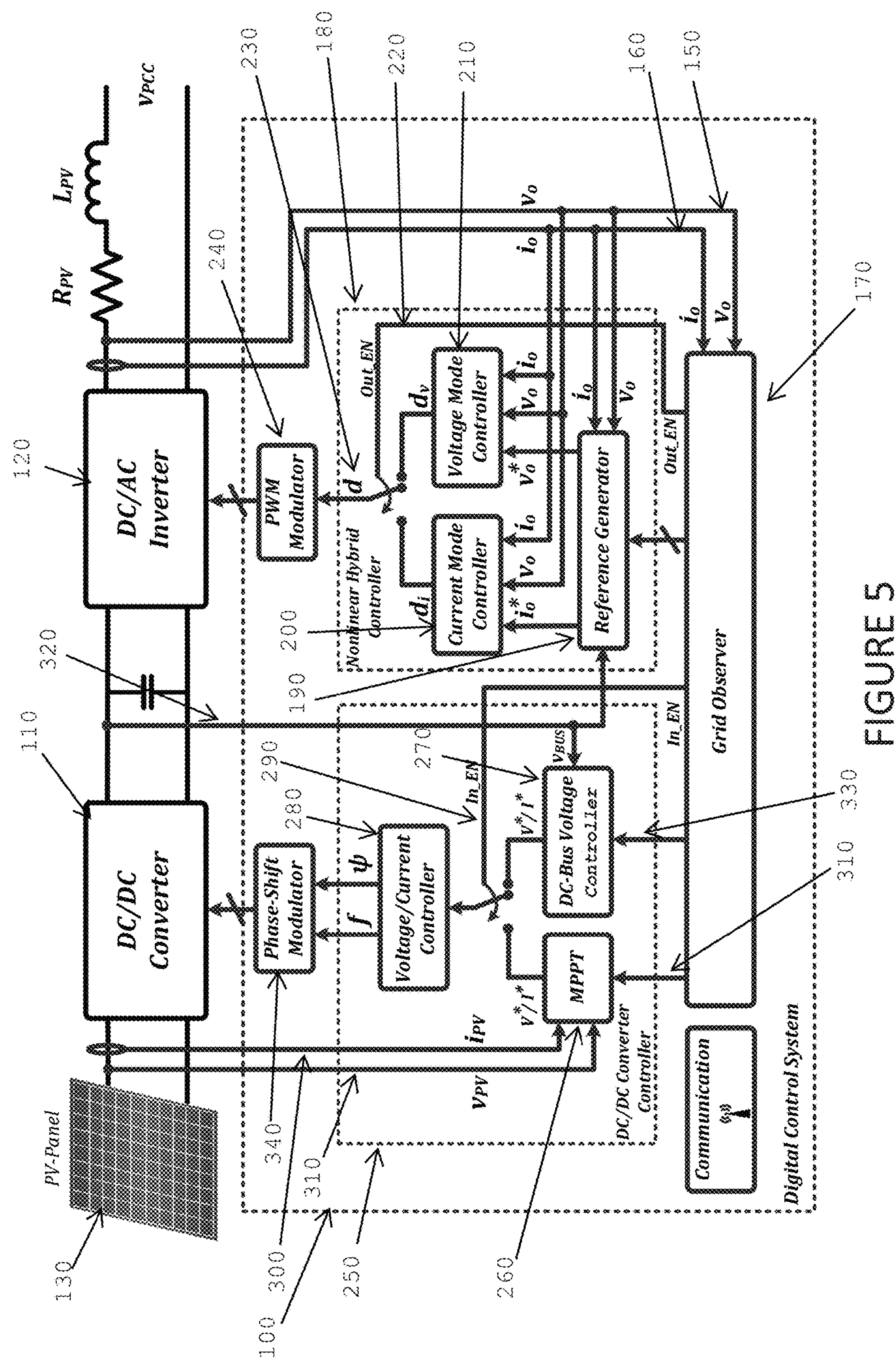
FIG. 5 is a block diagram of a control system according to one aspect of the invention.

Referring to FIG. 5, a block diagram of the control system 100 according to one aspect of the invention is illustrated. The control system 100 determines the operating mode and function of the DC/DC converter 110 and the DC/AC inverter 120. The converter 110 and inverter 120 operates to convert energy from the PV panel 130 so that it can be used by a local load or by a power grid. The power grid, if present, couples to the inverter 120 by way of a point of common coupling. The voltage 140 at the point of common coupling is regulated by different components depending on the operating mode of the inverter 120.

The output voltage 150 and output current 160 of the inverter 120 are received by a grid observer block 170 as well as by a nonlinear hybrid controller 180. Within the hybrid controller 180 is a reference generator 190, a current mode controller 200, and a voltage mode controller 210. The output of the hybrid controller is determined by an output enable signal 220 from the grid observer block 170. The signal 220 determines if the output of the hybrid controller is taken from either the current mode controller 200 or the voltage mode controller 210. This output of the hybrid controller (a duty cycle signal 230) is received by a pulse width modulation modulator block 240. The modulator block 240 outputs a signal received by the inverter 120 that determines the output voltage 150 and output current 160 of the inverter 120.

Also part of the control system 100 is a DC/DC converter controller 250. Contained within the converter controller 250 is a maximum power point tracking (MPPT) module 260, a DC bus voltage controller 270, and a voltage/current controller 280. The input to the voltage/current controller 280 is determined by an input enable signal 290 received from the grid observer block 170. This enable signal 290 selects between the output of the MPPT module 260 and the output of the DC-bus voltage controller 270. The MPPT module receives the current output 300 and the voltage output 310 of the PV panel 130. A control signal 320 from the grid observer block 170 is also received by the MPPT module 260. A bus voltage 320 of the bus between converter 110 and the inverter 120 is also received by both the DC Bus voltage controller 270 and the reference generator 190. A signal 330 from the grid observer block 170 is also received by the DB bus voltage controller 270.

It should be noted that the output of the converter controller 250 are a frequency and a phase from the voltage/current controller module 280. This frequency and phase are received by a phase-shift modulator block 340 whose output is received by the converter 110. The phase-shift modulator block 340 output determines the output of the converter 110.

As noted above, there are three possible modes of operation for the inverter 120: Mode I for when the grid is disconnected from the inverter and no other energy sources are regulating the voltage at the point of common coupling, Mode II for when the grid is disconnected from the inverter and the point of common coupling voltage is regulated by an energy source other than the inverter, and Mode III for when the grid is active and connected and is regulating the voltage at the point of common coupling. Depending on the mode of operation, the various modules and blocks of the control system are active or inactive.

In operation, the control system 100 works by first sensing the output current and output voltage of the inverter 120. The grid observer block 170 then uses these signals to determine which mode the inverter should be operating under. If Mode I is selected by the grid observer block 170, then the input enable signal 290 is set so that the input to the voltage/current controller module 280 receives the output of the DC-bus voltage controller 270. At the same time, the grid observer block 170 sets the output enable signal 220 so that the duty cycle 230 fed to the PWM modulator 240 comes from the voltage mode controller module 210. The reference generator 190 then determines a reference signal ($v_o$*) based on load information received from the grid observer block 170 and on the bus voltage 320. The reference signal is a desired magnitude and frequency for the voltage at the point of common coupling for this mode. The voltage mode controller 210 then determines, given the output current and output voltage of the inverter along with the reference signal, what the suitable duty cycle should be for the PWM modulator 240 so that the output of the inverter 120 results in the desired voltage at the point of common coupling. In Mode I, since the DC bus voltage controller 270 is active, then the MPPT module 260 is inactive. The grid observer block 170 also sends the estimated load information to the DC bus voltage controller as the signal 330 so that the DC bus voltage controller 270 can ensure that the power input to the inverter (by way of the bus) matches that load.

In Modes II and III, the voltage at the point of common coupling is not regulated by the inverter 120. As such, the inverter 120 operates in current mode and not in voltage mode. Thus, the grid observer block 170 ensures that the output enable signal 220 and the input enable signal 290 are set so that the MMPT module 260 and the current mode controller 200 are active and that their outputs are received by the phase-shift modulator block 340 and by the PWM modulator block 240. However, it should be noted that, while the grid observer estimates the load information from the output voltage and the output current of the inverter 120, the grid observer 170 sends a control signal to the MPPT module 260 so that the input power to the inverter 120 from the converter 110 is clipped when the load demand (from the load information) is lower than the input power. For the nonlinear hybrid controller 180, the grid observer sends the load information to the reference generator 190. Then, the reference generator 190 formulates a reference signal ($i_o$*) which is used by the current mode controller 200, along with the output voltage 160 and output current 150 to output the required duty cycle for the PWM modulator 240.

From FIG. 5, it should be clear that the digital control system of the microinverter is able to operate in on-grid as well as off-grid mode. From FIG. 4, the grid observer adaptively changes the control structure of the microinverter for different grid condition. The three different modes are defined as follows:

(i) Mode I: off-grid without energy storage or other energy sources (ii) Mode II: off grid with energy storage or other energy sources (iii) Mode III: on-grid.

As can be seen from FIG. 5, when the grid observer determines that the microinverter must operate in mode I, the DC/AC inverter must regulate the voltage at the point of common coupling, $v_{PCC}$. Therefore, the nonlinear hybrid controller operates in the voltage mode control in order to control the voltage at the point of common coupling, $v_{PCC}$. In this case, load information is estimated by the grid observer and this load information is sent to the reference generator. The reference generator produces the reference signal with an appropriate magnitude and frequency for the voltage at the point of common coupling. During Mode I, the Maximum Power Point Tracking (MPPT) module in the input stage (i.e. the DC/DC converter controller) is disabled as well since the input power must match the load. The required amount of input power is thus determined by the DC-bus Voltage Controller in the DC/DC Converter Controller from the load information from the grid observer block.

Also from FIG. 5, when the grid observer determines that the microinverter must operate in Mode II, the DC/AC inverter must control the output current. The current mode controller in the nonlinear hybrid controller of the DC/AC inverter is therefore enabled by the grid observer. In Mode II, the current mode controller in the nonlinear hybrid controller regulates the DC-bus voltage and controls the output current of the inverter. The magnitude and the phase of the output current are determined by the grid observer according to the load condition. In Mode II, the MPPT block is enabled in the DC/DC converter controller. However, there is a signal from the grid observer applied to the MPPT which clips the power if the load demand is lower than the input power. This is done by changing the reference value for the PV panel output voltage.

For Mode III, when the grid observer determines that the microinverter must operate in mode III, the DC/AC inverter controls the output current. In this mode the nonlinear hybrid controller regulates the DC-bus voltage and controls the output current of the inverter. In this mode, the MPPT in the DC/DC converter controller is enabled and controls the DC/DC converter such that the maximum power is extracted from the PV panel. It should be clear that, since in Mode III the power grid is regulating the voltage at the point of common coupling, the impedance detected by the grid observer would be quite different from the impedance in Mode II where a different energy source is regulating the common coupling voltage. Thus, the grid observer can differentiate between grid conditions which would determine whether the inverter is to operate in either Modes II or Mode III.

One aspect of the present invention provides the capability to provide both active and reactive power during different operating modes (i.e., Mode I, Mode II, Mode III). The microinverter is able to provide reactive power even when there is no active power from the PV panel (night-time). This is done by enabling the second stage DC/AC inverter along with the DC-bus capacitor. Providing the reactive power is very advantageous in micro/nano-grid applications where there is significant amount of reactive current required for the local loads.

Figure 6:
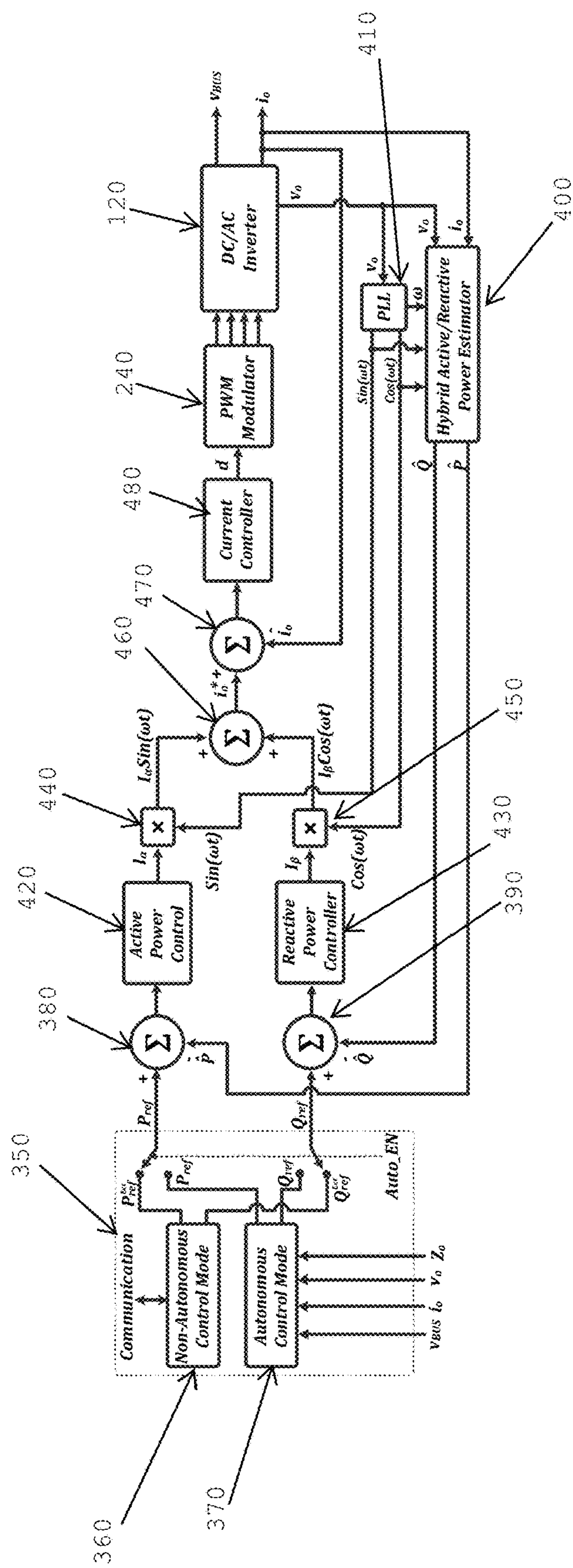
FIG. 6 is a block diagram of circuitry for providing active and reactive power when the inverter is operating in Mode II or Mode III.
Figure 8:
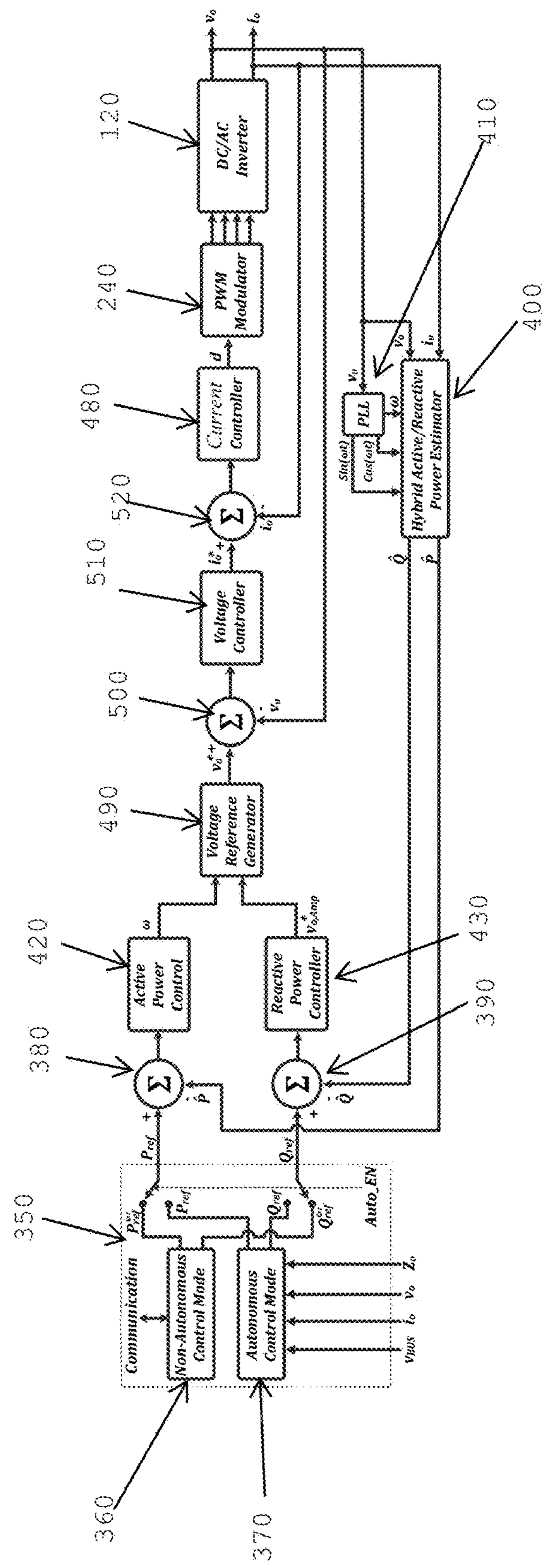
FIG. 8 is a block diagram of circuitry for providing active and reactive power when the inverter is operating in Mode I.

Referring to FIG. 6, a block diagram of a number of other components of the nonlinear hybrid controller 180 are illustrated. These components are active in Modes II and III to provide both reactive and active power. FIG. 8 illustrates the components active in the nonlinear hybrid controller 180 for providing both active and reactive power when the inverter is operating in Mode I or in voltage mode.

Returning to FIG. 6, an active/reactive power control block 350 determines the P and Q reference inputs for determining what reactive or active power is required by the system. In a non-autonomous mode, a non-autonomous control mode module 360 receives the reference P and Q values from a communications module with the reference P and Q values originating outside the controller 180. In autonomous mode, an autonomous control mode module 370 receives the bus voltage, the output current and output voltage of the inverter, as well as the output impedance of the inverter. Based on these values, the module 370 produces reference P and Q values for use by the system. An enable signal controls a switch which determines whether the reference P and Q values are taken from the non-autonomous control mode module 360 or from the autonomous control mode module 370. The difference between reference P and Q values and estimated P and Q values are then taken by summation blocks 380, 390. These estimated P and Q reactive/active power values are received from a hybrid active/reactive power estimator block 400. The estimator block 400 produces these estimated values based on the output voltage and output current of the inverter as well as from characteristics of the output voltage. These characteristics are received from a phase locked loop block 410 that receives and deconstructs the output voltage to produce the angular frequency of the output voltage as well as the sine and cosine components of the output voltage.

Again from FIG. 6, the summation block 380 has a result that is received by an active power control block 420. Similarly, the summation block 390 produces a result received by a reactive power controller block 430. Active power control block 420 produces the amplitude of the required active power signal while the reactive power control block 430 produces the amplitude of the required reactive power signal. These amplitudes are multiplied by multiplier blocks 440, 450 with the relevant sine and cosine components of the output voltage from the phase locked loop block 410. The results from the multiplier blocks 440, 450 are then added together by summation black 460 to result in a desired current signal $i_o$*. A difference is then taken between this desired output current signal and the actual output current of the inverter by a summation block 470. The result is then sent to a current controller 480 so that a suitable duty cycle d is produced such that, when the duty cycle is sent to the PWM modulator 240, the desired output current is produced by the inverter 120. It should be clear that the current controller 480 is simply the current mode controller 200 being used in a different role to provide active/reactive power.

From FIG. 6, the nonlinear hybrid controller controls the active and reactive power produced by the microinverter during Mode II and Mode III operation. According to FIG. 6, the reference value for the active and reactive power can be produced autonomously by the control system of microinverter or non-autonomously by through the communication unit.

Figure 7:
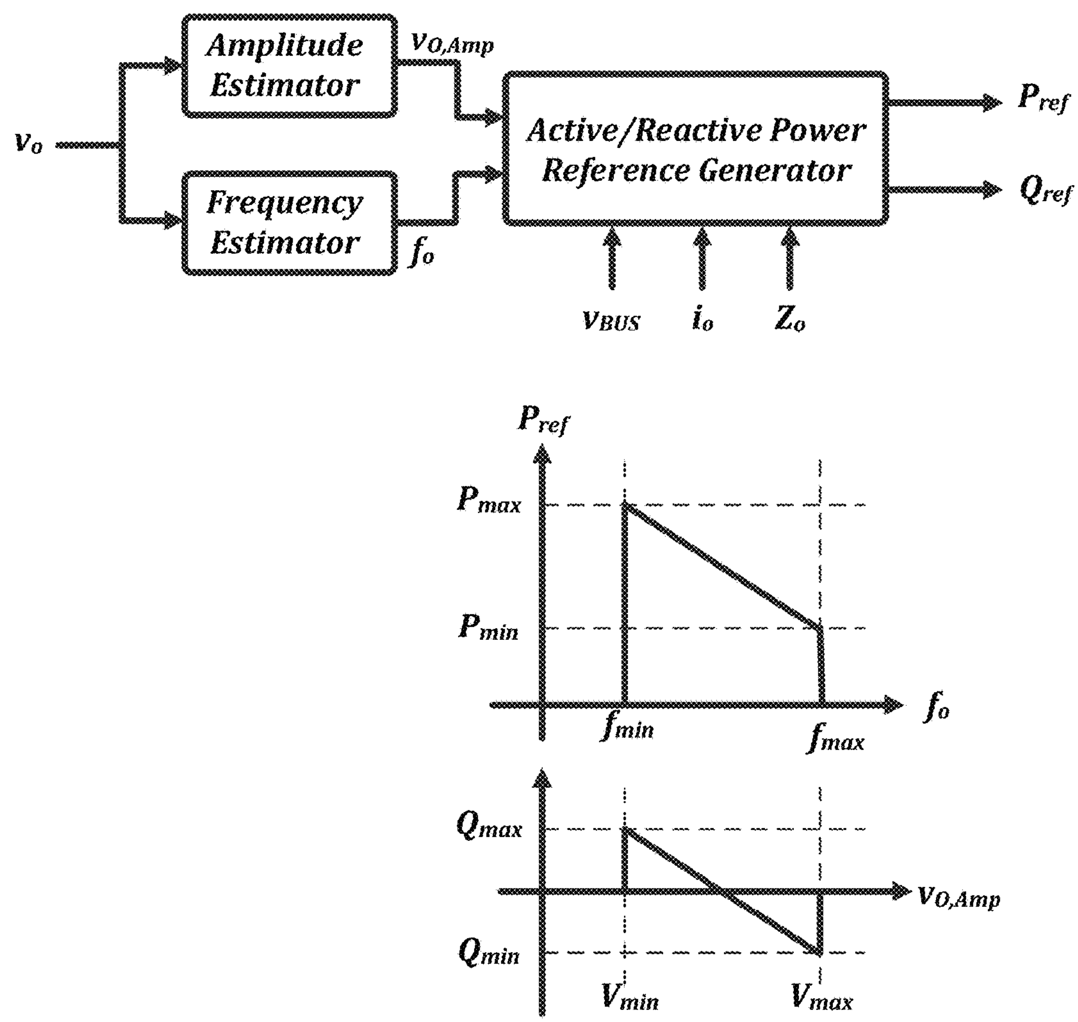
FIG. 7 illustrates an exemplary arrangement for determining active/reactive power reference values.

To clarify regarding the autonomous control mode block, FIG. 7 illustrates an exemplary arrangement for generating the active/reactive power reference values in the autonomous control mode. As can be seen, the output voltage of the inverter is sent to an amplitude estimator block and a frequency estimator block. The resulting amplitude and frequency are then sent to an active/reactive power reference generator. This generator also receives the bus voltage, the output current, and the output impedance to produce the reference P and Q values. As can be seen from the waveforms in FIG. 7, the reference P value and the reference Q value can be determined once the frequency and voltage of the output voltage are known and as long as these frequency and voltage values are within expected limits. In one implementation, the power reference generator is simple a special case of the reference generator 190 from FIG. 5.

For a Mode I operation, the configuration illustrated in FIG. 8 provides both reactive and active power during Mode I. It should be noted that, where suitable, similar reference numbers have been used between FIGS. 6 and 8.

Referring to FIG. 8, most of the circuitry and components in FIG. 8 are similar in function and identity to the components in FIG. 6. The differences arise once the active power control block 420 and reactive power controller block 430 are involved. The active power controller 420 produces the angular frequency of a desired voltage while the reactive power controller 430 produces the amplitude of this same desired voltage. The results of blocks 420, 430 are then fed into a voltage reference generator 490. This reference generator 490 generates the desired voltage and a difference is taken between this desired voltage and the actual output voltage of the inverter by summation block 500. The result is then sent to a voltage controller 510 which produces a desired current ($i_o$*). A difference between this desired current and the actual output current of the inverter is then taken by summation block 510 with the result being sent to a current controller 480. The current controller 480 produces a suitable duty cycle which, when sent to the PWM modulator 240 and then to the inverter 120, produces the desired output voltage and current from the inverter. It should be clear that the voltage controller 510 is simply the voltage mode controller from FIG. 5 and that the voltage reference generator 490 is the reference generator in FIG. 5 performing similar but related functions. By using the various components of the nonlinear hybrid controller, the system can be used to provide both reactive and active power during all modes of operation of the inverter.

As can be seen from FIG. 8, the nonlinear hybrid controller controls the active and reactive power produced by the microinverter during Mode I in the present invention. In Mode I, the active power controller produces the frequency of the reference signal for the output voltage of the microinverter and the reactive power controller produces the amplitude of the reference signal for the output voltage of the microinverter. It should be clear that both the active and reactive power controllers should ensure that the frequency and the voltage amplitude are within a standard range in order to deliver power to the critical loads.

It should be noted that, depending on the implementation, aspects of the invention can be implemented using ASICs or application specific integrated circuits. As well, in conjunction with suitable analog devices, the control method can be implemented using any suitably programmed data processing device.

Some embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Other embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

A person understanding this invention may now conceive of alternative structures and embodiments or variations of the above all of which are intended to fall within the scope of the invention as defined in the claims that follow.

We claim:

1. A system for controlling a DC/DC converter and a DC/AC inverter, an output of said converter being input to said inverter, said converter receiving an input from a renewable energy source and an output of said inverter being sent to a power grid when a connection to said power grid at a point of common coupling is active, system comprising:

a grid observer block for receiving an output voltage and an output current of said inverter;

a nonlinear hybrid controller receiving an output of said grid observer;

a converter controller receiving said output of said grid observer, said converter controller also receiving an input voltage and an input current to said converter;

a phase shift modulator block receiving an output of said converter controller, an output of said phase shift modulator block being received by said converter;

a pulse width modulator block receiving an output of said nonlinear hybrid controller, an output of said pulse width modulator block being received by said inverter;

wherein said grid observer block determines a common coupling voltage at said point of common coupling based on said output voltage and said output current and, based on said voltage, determines an operating mode of said inverter.

2. A system according to claim 1, wherein said operating mode of said inverter is selected from either a voltage mode or a current mode.

3. A system according to claim 2, wherein, when the inverter is operating in voltage mode, a Maximum Power Point Tracking (MPPT) module in said converter controller block is inactive and a DC-bus voltage controller module in said converter controller is active.

4. A system according to claim 2, wherein, when the inverter is operating in current mode, a Maximum Power Point Tracking (MPPT) module in said converter controller block is active and a DC-bus voltage controller module in said converter controller is inactive.

5. A system according to claim 2, wherein, when the inverter is operating in current mode, said nonlinear hybrid controller controls an output current of said inverter.

6. A system according to claim 2, wherein, when the inverter is operating in voltage mode, said inverter regulates said common coupling voltage.

7. A system according to claim 1, wherein said inverter operates in voltage mode when said connection is inactive and no other energy sources are available to regulate said common coupling voltage.

8. A system according to claim 1, wherein said inverter operates in current mode when said connection is active or when said connection is inactive and other energy sources are available to regulate said common coupling voltage.

9. A system according to claim 1, wherein said nonlinear hybrid controller includes a current mode controller and a voltage mode controller, both of said current mode controller and said voltage mode controller being for providing a duty cycle to said pulse width modulator module, only one of said current mode controller and voltage mode controller being active at any point in time.

10. A system according to claim 9, wherein said nonlinear hybrid controller includes a reference generator module for providing reference signals to said current mode controller and to said voltage mode controller, said reference signals being based on said output voltage and output current of said inverter and a bus voltage at a connection between said inverter and said converter.

11. A system according to claim 10, wherein said reference signals sent to said current mode controller are signal characteristics of a desired output current of said inverter.

12. A system according to claim 10, wherein said reference signals sent to said voltage mode controller are signal characteristics of a desired common coupling voltage.

13. A system according to claim 1, wherein said nonlinear hybrid controller causes said inverter to provide both reactive and active power in both current and voltage modes of operation.

* * * * *